United States Patent

Gaub et al.

(10) Patent No.: US 9,460,744 B1
(45) Date of Patent: Oct. 4, 2016

(54) METHOD AND APPARATUS TO PREVENT SERVO INSTABILITY DUE TO COUPLING BETWEEN VOICE COIL MOTOR AND FEEDFORWARD SENSOR

(71) Applicant: Seagate Technology LLC, Cupertino, CA (US)

(72) Inventors: Stephen Matthew Gaub, Longmont, CO (US); Lou Supino, Boulder, CO (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 14/747,413

(22) Filed: Jun. 23, 2015

(51) Int. Cl.
*G11B 21/02* (2006.01)
*G11B 5/596* (2006.01)

(52) U.S. Cl.
CPC .................... *G11B 5/59694* (2013.01)

(58) Field of Classification Search
None
See application file for complete search history.

(56) References Cited

U.S. PATENT DOCUMENTS

| 7,486,469 | B1 * | 2/2009 | Semba | G11B 5/5547 |
| | | | | 360/75 |
| 8,379,342 | B2 | 2/2013 | Huang et al. | |
| 8,737,014 | B2 * | 5/2014 | Massarotti | G11B 5/5582 |
| | | | | 360/97.19 |
| 8,797,673 | B2 | 8/2014 | Supino | |
| 8,976,483 | B1 | 3/2015 | Kharisov | |
| 2007/0183076 | A1 | 8/2007 | Baugh et al. | |
| 2015/0243313 | A1 * | 8/2015 | Supino | G11B 5/58 |
| | | | | 360/78.05 |

OTHER PUBLICATIONS

Regalia, "Adaptive IIR Filtering in Signal Processing and Control", Marcel Dekker, Inc., 1995.

* cited by examiner

*Primary Examiner* — K. Wong
(74) *Attorney, Agent, or Firm* — Hollingsworth Davis, LLC

(57) ABSTRACT

A voice coil motor control signal is detected being coupled into a vibration sensor of a hard disk drive. The vibration sensor is used to provide a feedforward signal to a servo control system of the hard disk drive. In response to detecting the coupling, the feedforward signal is modified to prevent instability of the servo control system.

20 Claims, 8 Drawing Sheets

METHOD AND APPARATUS TO PREVENT SERVO INSTABILITY DUE TO COUPLING BETWEEN VOICE COIL MOTOR AND FEEDFORWARD SENSOR

SUMMARY

Various embodiments described herein are generally directed to preventing servo instability due to coupling between a voice coil motor and feedforward sensor. In one embodiment, a method and/or apparatus detects that a voice coil motor control signal is being coupled into a vibration sensor of a hard disk drive. The vibration sensor is used to provide a feedforward signal to a servo control system of the hard disk drive. In response to detecting the coupling, the feedforward signal is modified to prevent instability of the servo control system.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Some hard drives, such as drives used in portable devices, are designed with the assumption that significant mechanical disturbance (e.g., shock, vibration) of the drive may occur while the hard drive is operating. As such, the hard drives may include measures to compensate for shock and vibration during operation. However, even in a fixed installation, shock and vibration may be present. For example, in a multi-drive configuration such as a disk array, the cooling fans as well as the drives themselves may generate vibrations that may be transmitted between hard drives through the structure in which they are mounted. This vibration can affect, among other things, tracking of the read/write head over the recording media. In other installations (e.g., a tablet or laptop computer), vibration generating components such as speakers, force-feedback devices, keyboards, etc., may cause similar disturbances that affect a hard drive.

One technique for dealing with disturbance is known as feed-forward compensation. A feed-forward compensator generally operates by measuring vibration (e.g., via an accelerometer or piezoelectric sensor) and using the measurement to form a compensation signal. The compensation signal is combined with an actuator control signal to mitigate the effects of the disturbance. While feed-forward compensation can be effective, it is not without its drawbacks. For example, there may be mechanical and/or electrical coupling between the actuators (e.g., voice coil motor) and the feed-forward sensors (e.g., vibration sensors). This transfer can result in a pseudo-positive feedback, which can lead to instability or poor tracking performance.

Figure 1:
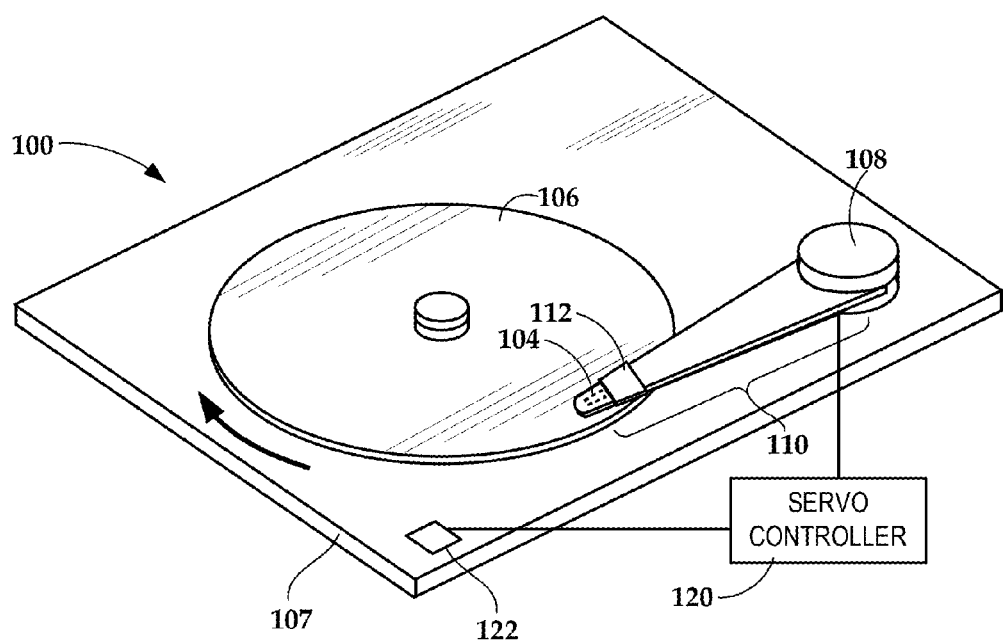
FIG. 1 is a perspective view of an apparatus according to an example embodiment.

In the present disclosure, methods and apparatuses are described that can detect and alleviate the feedforward effects caused by coupling between servo actuators and feed-forward sensors. Generally, the actuator that is coupled to the sensor is a voice coil motor, although instability can affect the servo system as a whole (e.g., cause instability in microactuator and voice coil motor). The proposed methods and apparatuses are described in the context of hard drive servo control systems, although may be applicable to other control systems. In FIG. 1, a perspective view that illustrates components of a hard drive apparatus 100 according to an example embodiment.

The apparatus 100 utilizes an actuating system to position a slider 104 over a spinning magnetic media 106 (e.g., a hard disk). An electric motor (not shown) mounted on a basedeck 107 drives the media 106 to achieve the desired media velocity. The slider 104 includes a read/write head that records to and reads from the media 106. The illustrated actuating system is a dual-stage configuration, which includes a voice coil motor (VCM) 108 that drives an arm 110 with the slider 104 mounted at the end. The dual-stage actuating system also includes a microactuator 112 mounted in the arm 110 for fine tracking control of the slider 104. The microactuator 112 may be referred to herein as a "PZT" in reference to a piezoelectric material used in some microactuators. However, such reference is not meant to limit the disclosure to piezoelectric microactuators.

While only one arm 110 and slider 104 is shown, the apparatus 100 may include multiple such arms, one for each surface of each disk 106 employed in the apparatus 100. Each arm may contain a microactuator for individual fine tracking control, although all arms may be commonly driven by the VCM 108. A servo controller 120 is electrically coupled to the microactuator 112 and VCM 108 to apply control signals. The servo controller 120 may also be coupled to read data back from the microactuator 112, VCM 108, slider 104 (e.g., to determine position signals), and other sensors (e.g., temperature sensors). The servo controller 120 includes at least one of a processor, memory, and specialized logic and analog circuitry (e.g., digital signal processing circuitry, amplifiers, filters).

The illustrated microactuator 112 is shown located within a suspension of the arm 110. In other configurations, the microactuator 112 may be positioned elsewhere, such as between the end of the arm 110 and the slider 104. The functions of the microactuator 112 may include fine/fast tracking and seeking control, reduction of run-out and other functions that generally improve drive performance. While the illustrated dual-stage actuating system is shown as driving a pivoting arm 110, concepts described below may be applicable to other types of drive systems, e.g., linear tracking arms.

One or more vibration sensors 122 may be located on the basedeck 107 and/or on any other structure or component. The vibration sensor 122 measures rotational and/or linear vibration, and can be used by the servo controller 120 for feed-forward compensation. The vibration sensor 122 may be sensitive not only to random noise, but to electromagnetic signals and vibrations induced by the VCM 108 and other components. Coupling between the VCM and vibration sensor, if not dealt with, can impact performance of the servo control system as will be described in greater detail below.

Figure 2:
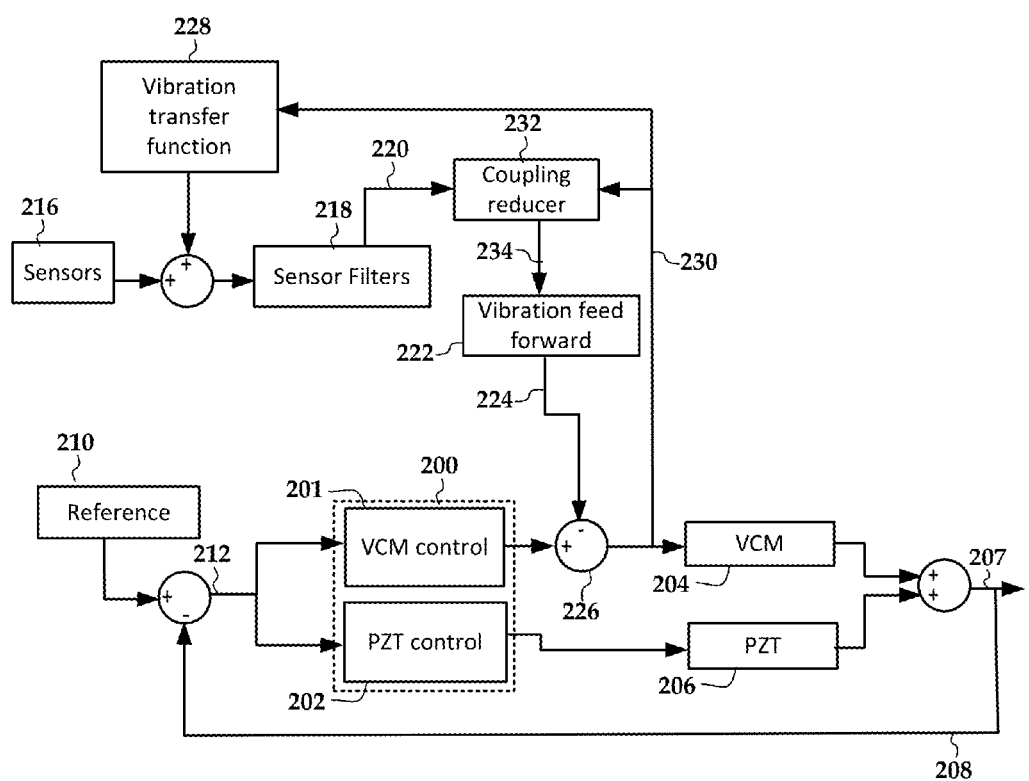
FIG. 2 is a block diagram of a servo control system according to an example embodiment.

In reference now to FIG. 2, a control diagram illustrates a servo control system according to an example embodiment. Generally, a controller 200 includes respective VCM control 201 and PZT control 202 portions that respectively provide signals to drive a VCM 204 and microactuator 206. The VCM 204 and microactuator 206 together change a position 207 of a read/write head. A reference input 210 is a command that drives the read/write head to a particular position. The difference between the reference position 210 and actual position 208 is defined as position error signal (PES) 212. The PES 212 is fed back to the controller 202, and the system attempts to maintain a zero value of PES 202 during steady state operations, e.g., tracking.

The illustrated control system uses one or more feedforward sensors 216. Generally, the sensors 216 are vibration sensors (e.g., accelerometers, strain gages, optical sensor) that can be configured to detect one or both of rotational vibration and translational vibration. The one or more sensors 216 may include one or more sensor mounted on a circuit board or some other central structure of the disk drive to detect external disturbance. In other embodiments the sensors 216 may include an additional vibration sensor mounted directly or closely to the VCM 204. While this may add to cost, this additional sensor may provide more accurate detection self-excitation levels and modes. Outputs of the sensors 216 are processed via a filter 218, and the filtered output 220 is used for feedforward compensation, as indicated by feedforward compensator 222. An output 224 of the feedforward compensator 222 is used for compensation of VCM control 201, as indicated by summation element 226. It will be understood that the feedforward compensator 222 may also provide compensation of PZT control 202, although it is not shown in this diagram.

Control effort to the VCM 204 results in forces being applied to the magnets of the VCM 204 as well as forces being applied to the read/write heads and supporting structures (e.g., actuator arms). These forces are applied during operations such as seek and track following. The forces applied to the VCM magnets propagate through the magnet structure to the base deck. These vibrations pass to the printed circuit board and are detected by the vibration sensors 216. Similarly the modes/motion of the read/write head and associated structures can propagate through the VCM 204 to the sensors 216. The electromagnetic field of the VCM 204, as well as conductors and circuitry that supply current to the VCM 204, can induce electrical signals in the sensors 216 and/or the sensor signal paths.

The mechanical and electromagnetic coupling results in a transfer function 228 between the VCM plant and the sensors 216, as indicated by path 230. The transfer function 228 includes, for example, modes of the read/write head support structures, modes of the base deck, modes of the mounting structure that supports the sensors 216, and modes of the disk drive mounting environment. The transfer function 228 may vary as a function of environmental factors (e.g., temperature, humidity, exogenous disturbance, mounting conditions) and so may be difficult to predict. As such, notching filters may have limited effect in reducing the effects of the transfer function 228. Further, as the areal density of the recording medium increases, the effects of the transfer function 228 may have more impact on servo performance due to decreased track pitch, for example. As such, adaptively mitigating the effects of the transfer function 228 may provide benefits for higher areal density technologies such as heat-assisted recording media, bit-patterned media, shingled recording, etc.

In order to mitigate the effects of the transfer function 228, a VCM coupling reducer 232 is used between the sensor filters 218 and the feedforward compensator 222. The output 234 of the reducer 232 is input to the feedforward compensator 222 in this example. It will be understood that the reducer 232 functionality may be implemented as part of the feedforward compensator 222 or be implemented after the feedforward compensator 222. In the latter case, the reducer 232 would be between the feedforward compensator 224 and the summation element 226 or feed directly into the summation element 226 in parallel with signal 224.

Figure 3:
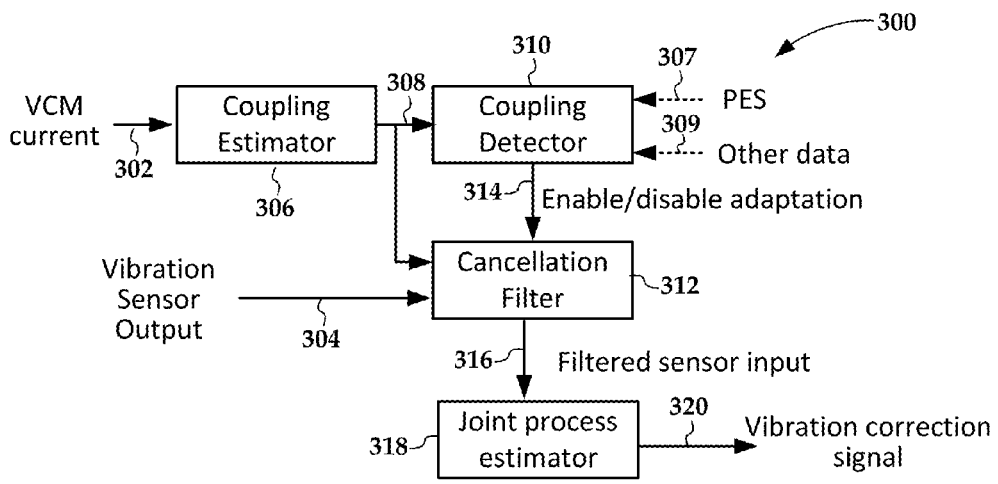
FIG. 3 is a block diagram of a coupling reducer according to an example embodiment.

In FIG. 3, a block diagram illustrates a VCM coupling compensator 300 according to an example embodiment. The compensator 300 receives a VCM electrical current indication 302 and vibration sensor output 304. As previously shown in FIG. 2 (e.g., output signal 220), the vibration sensor output 304 may already be filtered (e.g., notch filters) and include VCM signal components introduced via a transfer function (e.g., transfer function 228). The VCM electrical current indication 302 is indicative of an input value currently applied to the VCM and may be a controller state variable, such as a digital value used to set VCM electrical current levels via digital-to-analog converter. As such, the VCM electrical current indication 302 may be known by the servo system for every sample of servo control data.

A coupling estimator 306 uses the VCM current indicator 302 to determine a level of coupling between the VCM (and related components) and a vibration sensor. For example, the coupling estimator 306 may include a model of the actual/physical transfer function 228 shown in FIG. 2. This model may characterize the transfer function 228 between the VCM plant and vibration sensors for a population of drives in a given product line. Drive-to-drive variances and environmental variance (e.g., temperature variance) can be estimated. An output 308 of the coupling estimator 306 can serve as a basis for creating an in-drive observer/estimator for how the VCM plant affects vibration sensor response.

The output 308 of the coupling estimator 306 is input to a coupling detector 310 and a cancellation filter 312. The coupling detector 310 provides an enable/disable signal 314 in response to a determination that VCM coupling to the sensor may be affecting servo performance. If the VCM current 302 is zero, indicating the VCM is currently not in use, the enable/disable signal 314 may be set to disable by default. When the VCM is in use, the enable/disable signal 314 may be set to enable or disable in response to the estimated coupling signal 308 satisfying a threshold. Other optional data may also be used in order to make this estimation, as indicated by PES data 307 and other data 309. For example, if the estimated coupling signal 308 indicates a likelihood of VCM-to-sensor coupling, yet there is no corresponding spike in currently read PES 307, then the estimated coupling 308 may instead be due to exogenous disturbance. In such a case, the feedforward sensors would appear to be correctly compensating for the disturbance based on the low value of PES 307, and so enable/disable signal 314 may be set to disable the cancellation filter 312 or otherwise appropriately affect operation of the cancellation filter 312. The other data 309 may provide indicators that are analogous to PES 307. For example, the other data 309 may include user data errors or servo data errors. The other data 309 may also include vibration data from a sensor that is mounted on or near the VCM.

While the illustrated coupling reducer 300 uses the enable/disable signal 314 to activate or deactivate the cancellation filter 312, in other embodiments, the enable/disable signal 314 may be used instead or in addition for other actions, e.g., decoupling feedforward processing. Such other embodiments will be described in greater detail elsewhere below. Further, the detector 310 may provide the signal 314 with more information than a binary enable/disable, such as an n-bit probability that VCM-to-sensor coupling is present. In such a case, the cancellation filter 312 (or other component that receives the signal 314) may adapt based on the signal 314, and such adaptation may include the filter 312 self-disabling and/or self-enabling based on a fixed or moving threshold. The threshold may be based, e.g., on the capability of current notch filters used to reduce VCM coupling effects.

The cancellation filter 312 filters the VCM control signal effects that have filtered into the sensor output 304. The cancellation filter 312 may be configured as an adaptive filter, e.g., a finite impulse response (FIR) filter, an infinite impulse response (IIR) filter, etc. For example, the cancellation filter 312 may include a tapped state adaptive IIR in normalized lattice form. A tapped-state recursive lattice filter is stable when $|q_k|<pi/2$ for all k. The filter is stable even for time-varying coefficients, so long as $|q_k|<pi/2-e$ for all k and some fixed e. Bounding the rotation angles this way forces the lattice parameterization to be unique, and so the filter is suitable for adaptive applications.

A filtered sensor output 316 from the cancellation filter 312 is sent to a joint process estimator 318, which provides the desired vibration correction signal 320. The joint process estimator 318 (JPE) is a general digital filtering implementation that exploits orthogonality of a lattice. The joint process estimator 318 may have a lattice predictor stage and a forward section that provide forward and backward prediction errors. The joint process estimator 318 is used to cancel the disturbance detected by the sensors and correlated to PES 307. The vibration correction signal 320 can then be used to cancel the parasitic feedback loop effects due to the VCM control coupling path.

The cancellation of the parasitic feedback loop is accomplished by the cancellation filter 312. The cancellation filter 312 adaptively removes/reduces the coupling modes present in the sensor signal by using the output of the coupling estimator 306 and the sensor signal 304. Stated another way, the cancellation filter 312 adaptively filters the sensor signal 304 so that the coupling content is substantially reduced from the sensor signal 304. This filtered sensor signal 316 can then be used by the joint process estimator 318 to adaptively cancel exogenous disturbances.

Figure 4:
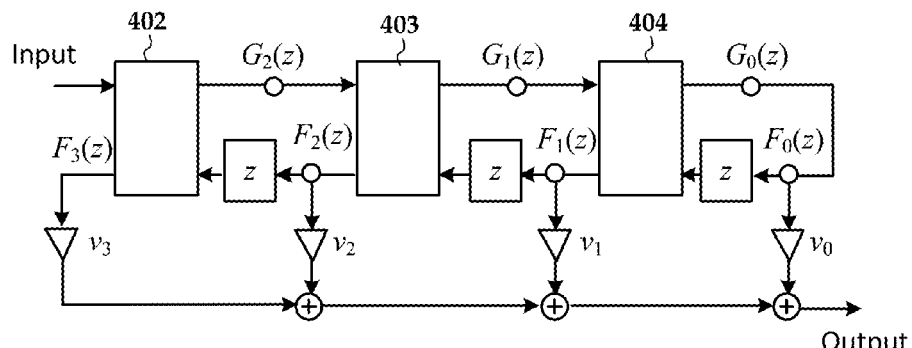
FIG. 4 is a block diagram of a tapped state lattice structure that may be used for an adaptive filter according to an example embodiment.

While the cancellation filter 312 can be any type of adaptive filter, in one implementation, a tapped-state recursive lattice filter may be used. FIG. 4, a block diagram illustrates a tapped state lattice IIR structure that may be used for an adaptive filter according to an example embodiment (e.g., filter 312 in FIG. 3). The illustrated lattice is a third-order filter with lattice nodes 402-404 that may be configured as shown in the block diagram of FIG. 5. The filter parameters are the rotation angles $[\lambda(0), \ldots, \lambda(n-1)]$, plus the tap parameters $[v_0, \ldots, v_{n-1}]$, which are related to the direct form filter parameters in a nonlinear manner. The tap parameters may be converted to the direct form filter parameters and vice versa. The cascade structure in the lattice filter propagates a forward signal $G_n(z)$ and a backward signal $F_n(z)$ at time k and section number n. By adapting the λs in such a way that $|sin(\lambda)|<1$, the stability of the lattice filter is ensured.

Figure 5:
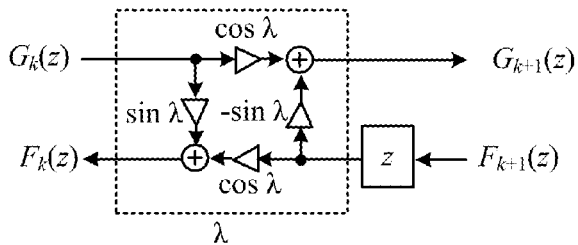
FIG. 5 is a block diagram of lattice nodes of the filter of FIG. 4 according to an example embodiment.

A tapped-state recursive lattice filter generally includes a cascade of interconnected Schur recursion steps, denoted λ, and a summation of weighted tap parameters, denoted v. The basic step in the Schur recursion structure is depicted in FIG. 5. The Schur recursion contains rotation angles, $\lambda(k)$, that span the forward and backward signal path of the lattice structure. These Schur sections cascade to form the recursive part of the lattice filter as depicted in FIG. 4. Additionally, a tapped-state recursive lattice IIR filter is stable when $|\lambda(k)|<pi/2$ for all k. This filter is stable even for time-varying coefficients, as long as $|\lambda(k)|<pi/2-\epsilon$ for all k and some fixed $\epsilon$. Also, bounding the rotation angles in this way, forces the lattice parameterization to be unique. These properties render the filter suitable for adaptive applications. The adaptation of the normalized lattice IIR filter coefficients can be achieved using the Simplified Hyperstable Sequential Regression algorithm.

Figure 6:
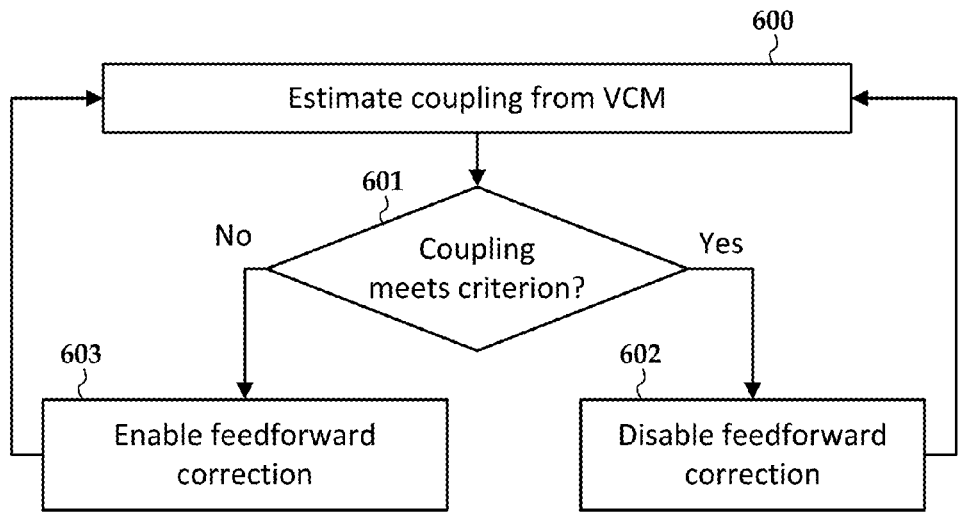
FIGS. 6 and 7 are flowcharts showing methods according to example embodiments.
Figure 7:
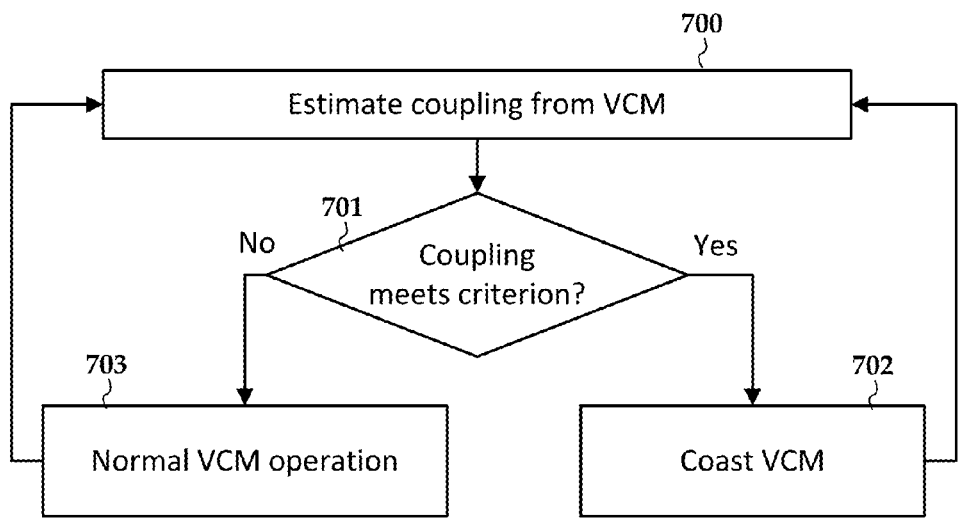

In FIGS. 6 and 7, flowcharts illustrate actions that may be taken by a servo control system according to other example embodiments. The actions shown in these flowcharts may be taken together or separately, and instead of or in addition to the adaptive filtering previously described. In FIG. 6, a method involves estimating 600 coupling between the VCM and vibration sensor. This estimation 600 may include any combination of applying a known VCM input to an estimated transfer function, analyzing a correlation between VCM input and other measures (e.g., PES), and any other techniques described herein. If the estimated coupling is determined 601 to meet a criteria (e.g., threshold such that servo tracking would be affected), then feedforward compensation is disabled 602 (or put in a safe mode). The disabling 602 may involve removing the feedforward signal from the servo control system, or otherwise negating any affect that the feedforward signals have on servo control. Generally, safe mode may involve limiting the use of feedforward correction without completely shutting it off or otherwise removing the feedforward signal from the control loop. If determination 601 is negative, feedforward compensation is enabled 603 (or taken out of safe mode).

In FIG. 7, a method involves estimating 700 coupling between the VCM and vibration sensor. This estimation 700 may similar as the estimation 600 in FIG. 6. If the estimated coupling is determined 701 to meet a criterion as described in FIG. 6, then the VCM is "coasted" 702. Generally, coasting involves modifying the behavior of the VCM to reduce instability. This may involve slowing or otherwise limiting the response of the VCM to prevent excessive movements that might be caused by coupling through the feedforward loop. For example, slew rate of the VCM may be limited. The feedforward compensation is still used while coasting. Otherwise, in the determination 701 is that there no coupling, the VCM is operated 703 using standard parameters.

Figures 8, 9:
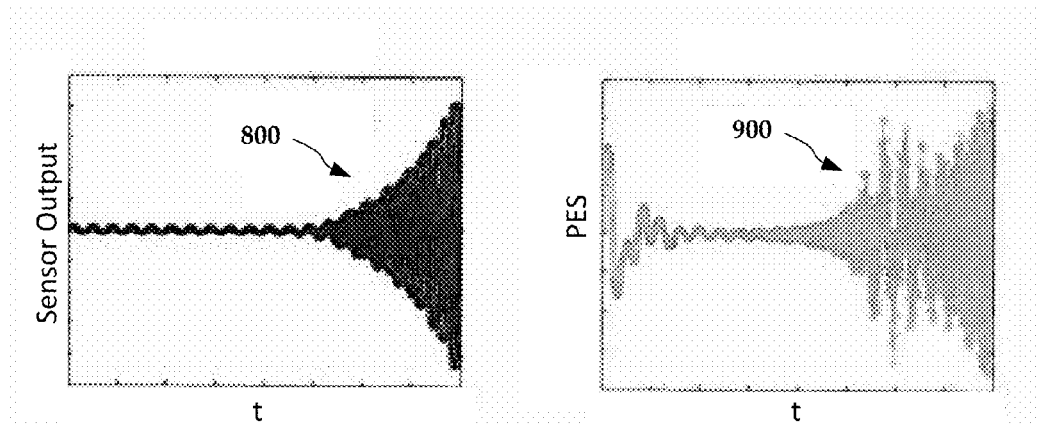
FIGS. 8-13 are graphs showing results of simulation of a servo system according to an example embodiment.

A simulation of a hard disk system was utilized to simulate the VCM-to-sensor coupling described herein. The simulation also determined the effects of an adaptive filter as shown in FIGS. 4 and 5. In FIG. 8, a graph shows a time-domain vibration sensor signal, with the time region 800 indicating the effect of VCM coupling to the sensor. In FIG. 9, a time-domain plot of PES for the device shows the results of the coupling at time region 900. Generally, the PES exhibits spikes due to the pseudo-forward feedback from the VCM induced into the feedforward sensors. The feedforward compensator attempts to compensate for the VCM inputs, resulting in instability seen in time region 900.

Figures 10, 11:
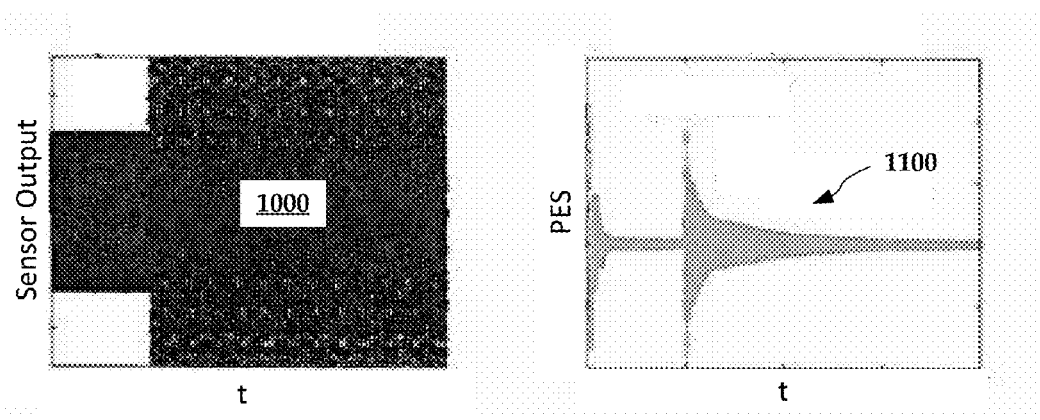

In FIGS. 10 and 11, graphs illustrate effects of adaptively filtering the feedforward signals in response to VCM activity. In FIG. 10, a graph shows a time-domain vibration sensor signal, with the region 1000 indicating long-term VCM coupling to the sensor. In FIG. 11, a time-domain plot of PES for the device shows the results of an adaptive filter being applied at time region 1100. After an initial spike in PES, the PES stabilizes as the filter adaptively removes the components of the VCM coupling.

Figure 12:
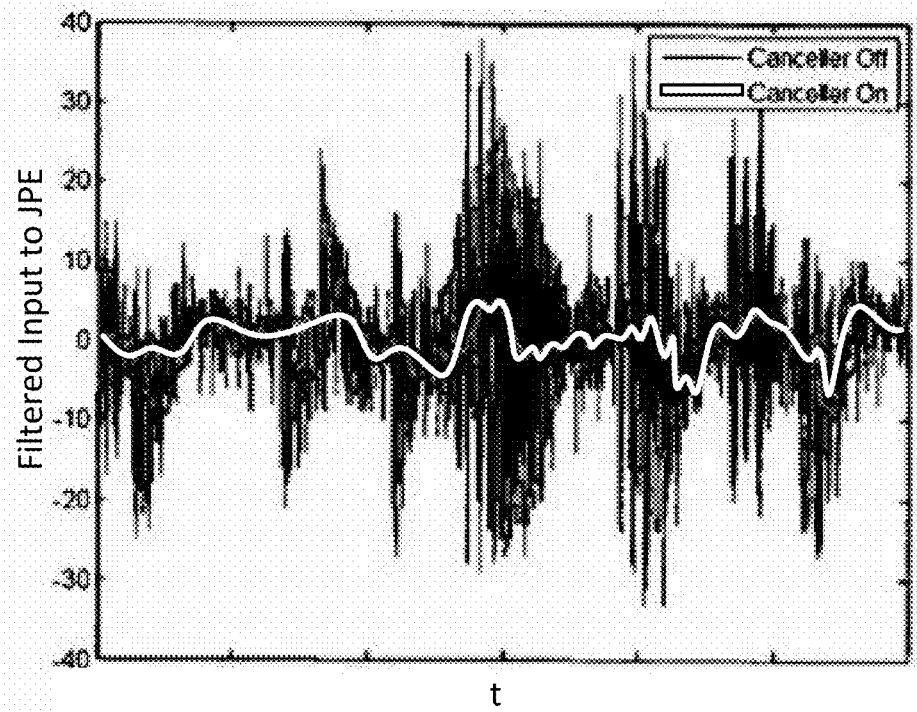
Figure 13:
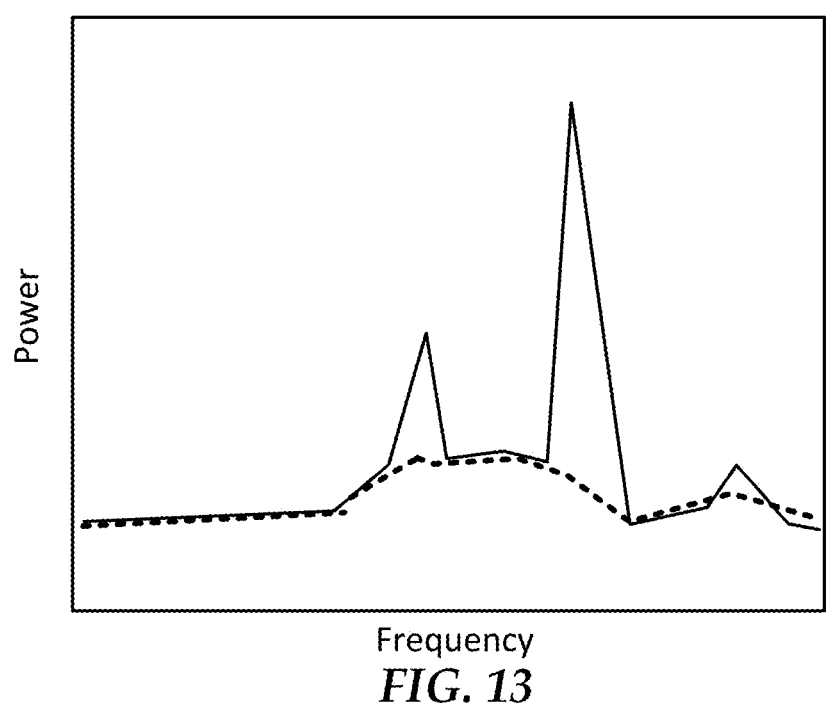

In FIG. 12, a graph shows a comparison between sensor output that was adaptively filtered for processing by the joint process estimator (white) and sensor output that was not filtered (black). In FIG. 13, a frequency response plot illustrates the spectrum of the signal shown in FIG. 12, with the solid lines being the unfiltered input to the joint process estimator and the dashed lines being the unfiltered input.

Figure 14:
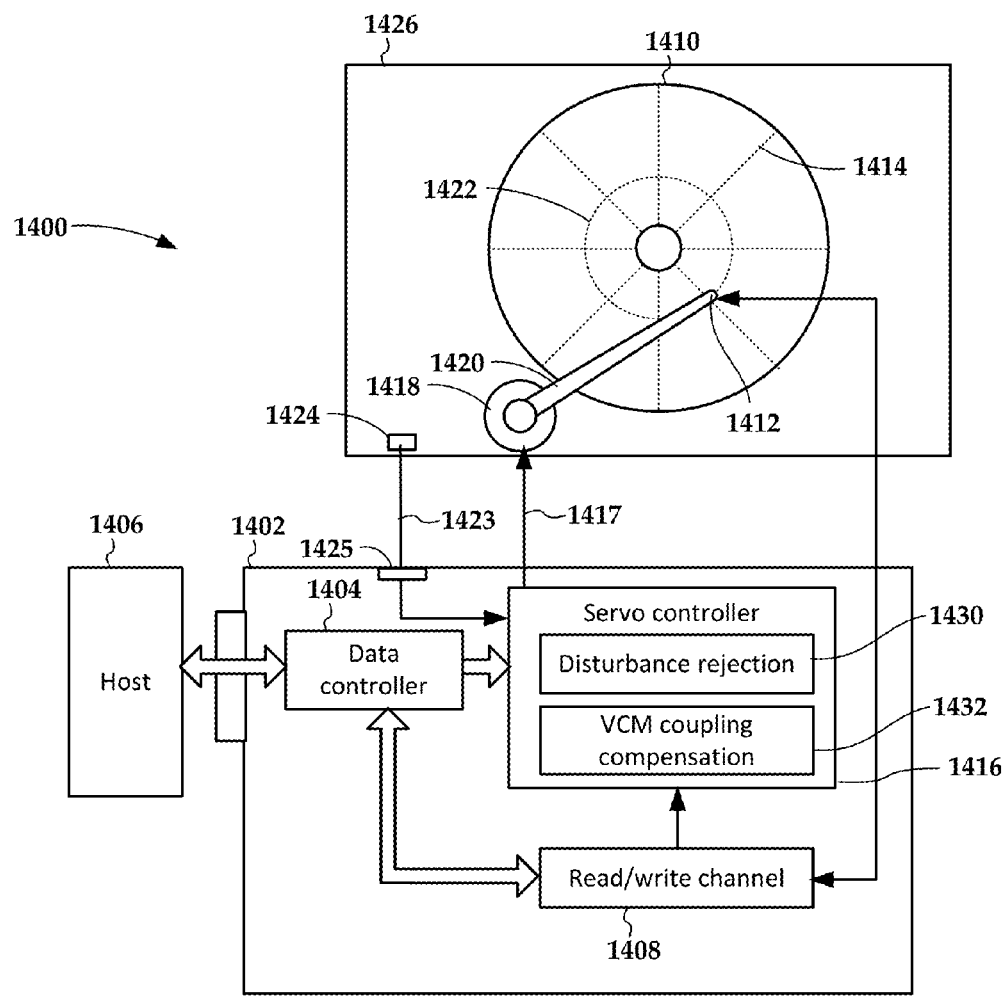
FIG. 14 is a block diagram of a hard disk drive according to an example embodiment.

While the servo control systems described above may be used in any positioning application, various features are described in the context of a hard disk drive. In FIG. 14, a block diagram illustrates a control logic circuit 1402 of a hard disk drive 1400 according to an example embodiment. The circuitry 1402 includes a data controller 1404 that processes read and write commands and associated data from a host device 1406. The host device 1406 may include any electronic device that can be communicatively coupled to store and retrieve data from a data storage device, e.g., a computer. The data controller 1404 is coupled to a read/write channel 1408 that reads from and writes to a surface of a magnetic disk 1410.

The read/write channel 1408 generally converts data between the digital signals processed by the data controller 1404 and the analog signals conducted through one or more read/write heads 1412 during read operations. To facilitate the read operations, the read/write channel 1408 may include analog and digital circuitry such as preamplifiers, filters, decoders, digital-to-analog converters, timing-correction units, etc. The read/write channel 1408 also provides servo data read from servo wedges 1414 on the magnetic disk 1410 to a servo controller 1416. The servo controller 1416 uses these signals to provide a voice coil motor control signal 1417 to a VCM 1418. The VCM 1418 rotates an arm 1420 upon which the read/write heads 1412 are mounted in response to the voice coil motor control signal 1417.

Data within the servo wedges 1414 is used to detect the location of a read/write head 1412 relative to the magnetic disk 1410. The servo controller 1416 uses servo data to move a read/write head 1412 to an addressed track 1422 and block on the magnetic disk 1410 in response to the read/write commands (seek mode). While data is being written to and/or read from the disk 1410, the servo data is also used to maintain the read/write head 1412 aligned with the track 1422 (track following mode).

The tracking of the read/write head 1412 can be affected by exogenous disturbance, e.g., shock and vibration transmitted through structures to which the hard disk drive 1400 is mounted. To assist in detecting and compensating for these disturbances, the servo controller 1416 receives signals 1423 from a vibration sensor 1424 mechanically coupled to a basedeck 1426, e.g., via a printed circuit board. The signals 1423 are processed via a vibration sensor interface 1425. The vibration sensor interface 1425 may include analog and digital circuitry such as preamplifiers, filters, digital-to-analog converters, etc. A feedforward disturbance rejection module 1430 receives the vibration sensor data from the interface 1425 and processes this data to compensate for disturbances via a servo control loop. A VCM compensation module 1432 which may be configured to pre-process (or post-process) the vibration sensor signals 1423 to reduce or remove VCM-to-sensor coupling artifacts. The disturbance rejection module 1430 and VCM compensation module 1432 may be implemented as software or firmware modules within the servo controller 1416 and/or may use dedicated logic circuitry to perform some operations.

Although two separate controllers 1404 and 1416 and a read write channel 1408 have been shown for purposes of illustration, it is to be understood that their functionality described herein may be integrated within a common integrated circuit package or distributed among more than one integrated circuit package. Similarly, a head disk assembly can include a plurality of data storage disks 1410, an actuator arm 1420 with a plurality of read/write heads 1412 (or other sensors) which are moved radially across different data storage surfaces of the disk(s) 1410 by the actuator motor 1418 (e.g., voice coil motor), and a spindle motor (not shown) which rotates the disk(s) 1410.

Figure 15:
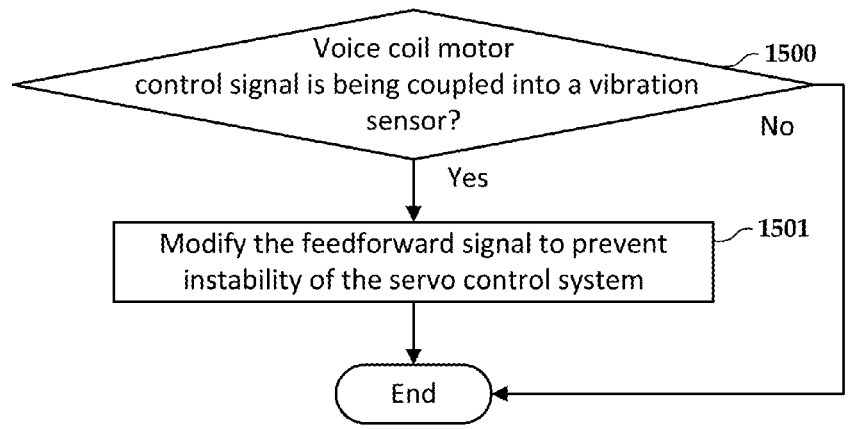
FIGS. 15 and 16 are flowcharts showing methods according to example embodiments.

In reference now to FIG. 15, a flowchart illustrates a method according to an example embodiment. The method involves detecting 1500 that a voice coil motor control signal is being coupled into a vibration sensor of a hard disk drive. The vibration sensor is used to provide a feedforward signal to a servo control system of the hard disk drive. In response to detecting the coupling (block 1500 returns "yes"), the feedforward signal is modified (e.g., filtered, shut off) to prevent instability of the servo control system.

Figure 16:
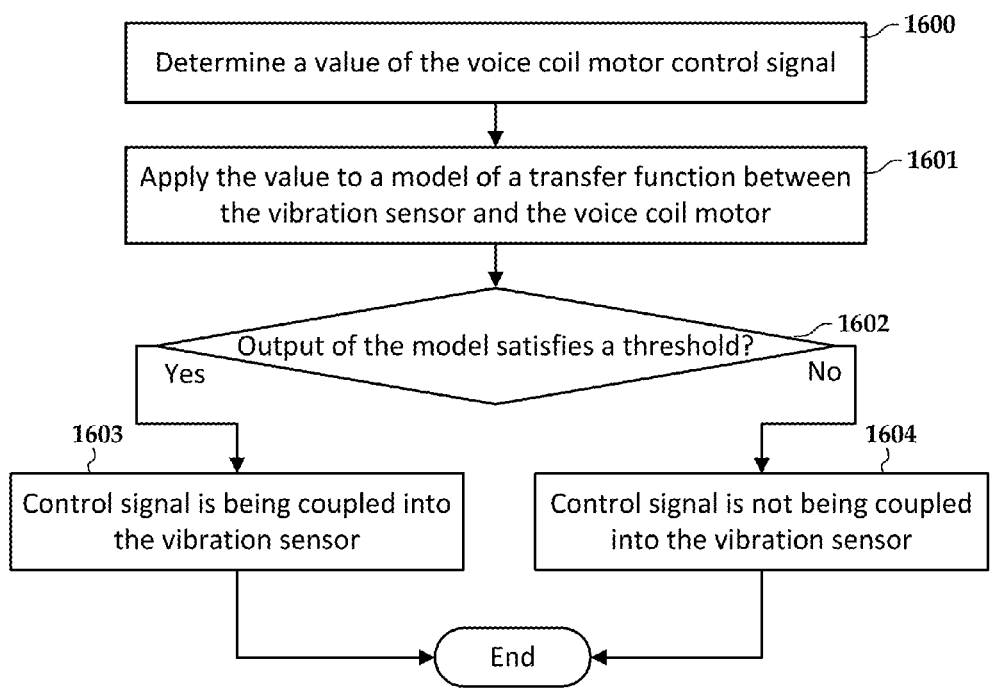

In reference now to FIG. 16, a flowchart illustrates a method for detecting that a voice coil motor control signal is being coupled into a vibration sensor of a hard disk drive as shown in block 1500 of FIG. 15. The method involves determining 1600 a value of the voice coil motor control signal. The value is applied 1601 to a model of a transfer function between the vibration sensor and a voice coil motor to which voice coil motor control signal is being applied. The coupling is detected 1603 based on the output of the model satisfying 1602 a threshold, otherwise coupling is not detected 1604.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method comprising:
   estimating an electromagnetic coupling of a voice coil motor control signal into a vibration sensor of a hard disk drive, the vibration sensor used to provide a feedforward signal to a servo control system of the hard disk drive; and
   in response to the estimation, modifying the feedforward signal to prevent instability of the servo control system.

2. The method of claim 1, wherein estimating the coupling comprises:
   determining a value of a current of the voice coil motor control signal;
   applying the value to a model of a transfer function between the vibration sensor and a voice coil motor to which voice coil motor control signal is being applied; and
   estimating the coupling based on the output of the model satisfying a threshold.

3. The method of claim 1, wherein modifying the feedforward signal comprises filtering the feedforward signal via an adaptive filter.

4. The method of claim 3, wherein the adaptive filter comprises an infinite impulse response lattice filter.

5. The method of claim 3, wherein the adaptive filter comprises a tapped-state recursive lattice filter.

6. The method of claim 3, wherein modifying the feedforward signal comprises processing an output of the adaptive filter with a joint process estimator.

7. The method of claim 1, wherein modifying the feedforward signal comprises removing the feedforward signal from the servo control system.

8. The method of claim 1, wherein modifying the feedforward signal comprises entering a feedforward safe mode.

9. The method of claim 1, further comprising modifying a behavior of a voice coil motor to reduce instability in response to detecting the coupling.

10. The method of claim 9, wherein modifying the behavior of the voice coil motor comprises limiting a slew rate of the voice coil motor.

11. The method of claim 1, further comprising detecting that a voice coil motor is currently being activated based on the voice coil motor control signal, and wherein the estimating of the coupling occurs in response to the voice coil motor being currently activated, wherein no coupling detection occurs if the voice coil motor is not being activated.

12. An apparatus comprising:
   a vibration sensor interface that processes feedforward signals received from a vibration sensor; and
   a controller coupled to the vibration sensor interface, the controller configured to:
      estimating an electromagnetic coupling of a voice coil motor control signal into a vibration sensor of a hard disk drive; and
      in response to the estimation, modify the feedforward signals to prevent instability of a servo control system.

13. The apparatus of claim 12, wherein estimating the coupling comprises:
   determining a value of the voice coil motor control signal;
   applying the value to a model of a transfer function between the vibration sensor and a voice coil motor to which voice coil motor control signal is being applied; and
   estimating the coupling based on the output of the model satisfying a threshold.

14. The apparatus of claim 12, further comprising an infinite impulse response lattice filter that filters the feedforward signal in response to detecting the coupling.

15. The apparatus of claim 14, further comprising a joint process estimator that processes an output of the infinite impulse response lattice filter.

16. The apparatus of claim 12, wherein modifying the feedforward signal comprises at least one of removing the feedforward signal from the servo control system and entering a feedforward safe mode.

17. A hard disk servo control system comprising:
   a voice coil motor;
   a vibration sensor that provides feedforward signals; and
   a servo controller coupled to the voice coil motor and the vibration sensor, the servo controller configured to:
      determine a value of a control signal current sent to the voice coil motor;
      apply the value to a model of a transfer function between the vibration sensor and the voice coil motor;
      estimate an electromagnetic coupling between the vibration sensor and the control signal current based on the output of the model; and
      in response to the estimation, modify at least one of a behavior of the voice coil motor and the feedforward signals to prevent instability of the servo control system.

18. The hard disk servo control system of claim 17, wherein modifying the behavior of the voice coil motor comprises limiting a slew rate of the voice coil motor.

19. The hard disk servo control system of claim 17, wherein modifying the feedforward signal comprises at least one of removing the feedforward signal from the servo control system and entering a feedforward safe mode.

20. The hard disk servo control system of claim 17, further comprising:
   an infinite impulse response lattice filter that filters the feedforward signal in response to detecting the coupling; and
   a joint process estimator that processes an output of the infinite impulse response lattice filter.

* * * * *